United States Patent
Shen

(10) Patent No.: US 7,946,748 B2
(45) Date of Patent: May 24, 2011

(54) MOSQUITO REPELLENT LAMP

(76) Inventor: Jianli Shen, Zhejiang (CN)

( * ) Notice: Subject to any disclaimer, the term of this patent is extended or adjusted under 35 U.S.C. 154(b) by 152 days.

(21) Appl. No.: 12/545,977

(22) Filed: Aug. 24, 2009

(65) Prior Publication Data

US 2010/0053935 A1 Mar. 4, 2010

(30) Foreign Application Priority Data

Sep. 2, 2008 (CN) .......................... 2008 1 0120723

(51) Int. Cl.
*H01R 33/00* (2006.01)
(52) U.S. Cl. .......... 362/643; 362/96; 362/101; 392/393; 43/129
(58) Field of Classification Search ............. 362/96, 362/101, 149, 253, 642, 64; 392/386–393; 422/121, 124–126, 306; 43/1, 125, 127, 43/129
See application file for complete search history.

(56) References Cited

U.S. PATENT DOCUMENTS

| | | | | |
|---|---|---|---|---|
| 6,033,212 | A * | 3/2000 | Bonnema et al. | 431/344 |
| 6,413,476 | B1 * | 7/2002 | Barnhart | 422/124 |
| 6,482,365 | B1 * | 11/2002 | Soller | 422/126 |
| 7,093,949 | B2 * | 8/2006 | Hart et al. | 362/96 |
| 7,204,870 | B2 * | 4/2007 | Zobele et al. | 96/222 |
| 7,285,248 | B2 * | 10/2007 | Yamamoto et al. | 422/123 |
| 7,481,571 | B2 * | 1/2009 | Bistritzky et al. | 362/643 |
| 7,887,760 | B2 * | 2/2011 | Yamamoto et al. | 422/124 |

* cited by examiner

*Primary Examiner* — Hargobind S Sawhney
(74) *Attorney, Agent, or Firm* — Global IP Services; Tianhua Gu

(57) ABSTRACT

A mosquito repellent lamp, comprising a lamp holder, which is provided with a lamp shade with luminous tube; a power switch for turning on and off the power; a mosquito repellent device mounted above said lamp shade; featured by that: said mosquito repellent device is provided with a cavity for contain mosquito repellent patch, which is provided with air inlets and outlets, which are interconnected, and a fan corresponding to the air inlets, said fan and said luminous tube are powered through a switchboard, which is connected with a fan switch for turning and stopping said fan. Compared with existing technologies, this patent provides the air inlets and air outlets on the mosquito repellent device and achieves better mosquito repellant effect by dispelling the effect of the mosquito repellent patch insides said mosquito repellent device from the air outlets by the airflow generated by said fan. Besides mosquito repellent patches, aromatics or deodorizers may also be placed in the mosquito repellent device to achieve the purpose of air purification or perfuming.

9 Claims, 9 Drawing Sheets

A-A

A-A

US 7,946,748 B2

MOSQUITO REPELLENT LAMP

CROSS REFERENCE TO THE RELATED PATENT APPLICATION

The present application claims the priority of the Chinese patent application No. 200810120723.X filed on Sep. 2, 2008, which application is incorporated herein by reference.

FIELD OF THE INVENTION

This invention relates to a kind of mosquito repellent lamp, which has the effect of mosquito repelling, sterilization, deodorization and air purification while providing lighting.

BACKGROUND OF THE INVENTION

Considering mosquito sting in summer, people have thought of adding mosquito repellent device to lighting instruments, for instance, Chinese utility model patent number CN87203596 "Mosquito Repellent Device for Lighting Instruments", Chinese utility model patent number CN85202716 "Double-duty Bulb for Lighting and mosquito repelling", both adopt location or additional device on bulb for mosquito repellent chemicals, when the bulb is turned on, the afterheat of the bulb can be used for heat the mosquito repellent patch and thus to repel mosquitoes. However, both patents above adopt afterheat of the bulb to heat the mosquito repellent or perfuming patches so as to dispel the medical effect, which provides low heating energy for the patches, therefore the medical odor dispelling effect is poor, moreover, due to long-term contact with the air, the patches are subject to volatilization and quick consumption.

Subsequently, some people designed mosquito repellent lamp without the need to replace patches, such as Chinese utility model patent number ZL200720106804.5 "A Mosquito Repellent Camping Lamp", which discloses a kind of mosquito repellent camping lamp, comprising the upper lid, the transparent enclosure and the cover, the transparent enclosure is tightly fixed between the upper lid and the cover through the pull rod connecting the upper lid and the cover, the transparent enclosure is provided with mosquito repellent luminous tubes, whose inner walls are coated with florescent powder layer with the luminescent spectrum between 530 nm-630 nm. Compared with the traditional method to install mosquito repellent patches on incandescent lamps, this patent kills mosquitoes by mosquito repellent luminous tubes with the principle of spectra, however, the effect of this patent is only available within certain effective distance and is impacted by lighting, moreover, once the florescent powder layer is damaged or peeled off, it is required to replace the whole tube, which adds to the cost. Furthermore, this lamp can only kill mosquitoes and has no effects of sterilization, deodorization and air purification.

Besides, there are also some mosquito repellent lamps at present utilizing suction force and hi-tension mesh, however, this kind of mosquito repellent lamps have the risk of electric shock and are not suitable to be used at home.

SUMMARY OF THE INVENTION

The technical problem to be solved by this invention is to provide a kind of mosquito repellent lamp that can accelerate the spreading of medical effect of patches so as to get better effect of mosquito repelling while having multiple functions like lighting and mosquito repelling etc. according to the current technological situation.

The technical solution of this invention to solve the technical problem above is: this mosquito repellent lamp, comprising A lamp holder, provided with a lamp shade with a luminous tube;

A power switch mounted on said lamp holder and electrically connected with said luminous tube to control the turning on and off of said luminous tube;

A mosquito repellent device with embedded mosquito repellent patch mounted on top of said lamp shade;

featured by that: said mosquito repellent device is provided with a cavity for containing said mosquito repellent patch, said cavity being provided with air inlets and outlets which are interconnected, a fan provided corresponding to said air inlets is electrically connected with said through a switch board for controlling the working status of said fan and said luminous tube, said switch board is further connected with a fan switch for turning and stopping said fan.

To prevent the mosquito repellent patches from volatilization and to facilitate the storage and use of the patches, said mosquito repellent device may adopt the following telescopic structure comprising:

A hollow cover;

A sleeve chuck in said cover being provided with a base plate provided with said air inlets, said base plate and the inner wall of said sleeve chuck form a cavity capable of containing said mosquito repellent patch, said fan is provided below said air inlets on said base plate;

and a pull cylinder, which sleeves around said sleeve chuck and capable of axially sliding in relation to said sleeve chuck till fully pulled open, said cover sleeves around said pull cylinder, on which said air outlets are opened, when that said pull cylinder sticks out of said cover, said air outlets are open, when said pull cylinder retracts back inside the cover, said air outlets are closed;

A locking structure is provided between said pull cylinder, sleeve chuck and cover to realize the axial positioning of said pull cylinder on said sleeve chuck when said pull cylinder sticks out of or retracts back inside said cover.

To ensure axial location of the relative axial sliding between said pull cylinder and said sleeve chuck, said locking structure may be as follows:

clips with elastic protrusions provided on the circumference of said sleeve chuck; correspondingly, a T-slot is made relative to said clips on the circumference of said pull cylinder, where, said T-slot is open on the bottom and provided with inner shoulders on the top, said protrusions may be engaged with the inner shoulders of said T-slot to limit the position of said pull cylinder axially;

snap buttons are provided at the position on the circumference of said cover opposite to the said elastic protrusions of said clips, said snap buttons are received in said T-slots and can move axially relative to said T-slot, when said pull cylinder retracts completely back inside said cover and said snap buttons are pressed, said elastic protrusions will release the limit for the position of said pull cylinder as being offset by the extrusion of said snap buttons, said pull cylinder can slide axially out of said cover along said sleeve chuck;

When said pull cylinder is fully pulled open axially relative to said sleeve chuck, the hooks on the inner circumference of said pull cylinder is connected with the protrusions on the guide grooves of said sleeve chuck to limit the position of said pull cylinder axially. When said pull cylinder moves relative to said sleeve chuck to make said hooks push against the protrusions in said guide grooves, said pull cylinder is fully pulled out relative to said sleeve chuck while not completely detached from it.

When the pull cylinder is pulled open axially relative to said sleeve chuck, said elastic protrusions are released from the extrusion of said snap buttons and returns to the original location and finally breaks away from the opening of the T-slot and push against the bottom rim of the pull cylinder, thus realizing axially positioning of the pull cylinder relative to the sleeve chuck and preventing it from sliding down.

There are 4 pairs of said hooks and protrusions on said guide grooves, symmetrically arranged on the circumference.

To facilitate the user to carry this mosquito repellent lamp, said pull cylinder is further connected with a handle by hinge. The user can hold the handle to lift the whole mosquito repellent lamp, when the lamp is to be laid aside, the handle can be lowered to facilitate storage.

To make better use of the effect of the mosquito repellent patch, said cover is further connected with a ventilating device, which is provided with at least one ventilating hole that can be open and closed, and said ventilating holes are opposite to and can be connected to the air inlets on the base plate of said sleeve chuck. When the pull cylinder and sleeve chuck of said mosquito repellent device is not pulled, the ventilating device may quickly dispel the medical odor of the mosquito repellent patch to the ambience, thus form an airflow channel between the air inlets and the ventilating hole.

Said ventilating device may simply adopt the following structure which: comprising a bottom plate with said ventilating hole and a rotary plate rotatably connected on said bottom plate, said rotary plate is provided with grid holes capable of being aligned to said ventilating holes, when said rotary plate is turned so as to allows said grid holes to be aligned with corresponding ventilating hole, said ventilating holes are open; when said rotary plate is turned as so to makes said grid holes to be staggered with corresponding ventilating holes, said ventilating holes are closed. If the rotary plate is rotated, said grid holes and said ventilating holes can be aligned, thus to open said ventilating holes, the ventilating holes can be closed when the rotary plate is turned so as to align the grid holes on the rotary plate with the ventilating holes, the operation is very simple and convenient.

Said bottom plate is fixedly connected to said fan, moreover, said switchboard is fixed on said bottom plate, said switchboard is provided with said fan switch to turn and stop said fan, a slot hole is provided on the base plate of said sleeve chuck for allowing said fan switch to be led out. Thus said fan is directly fixed on said bottom plate, which can facilitate the installation, moreover, the air inlets on the base plate of the sleeve chuck may directly adhere to the fan tightly, thus the wind can be directly blown into the air inlets when the fan is turning, which achieved better effect.

When the bottom rim of said pull cylinder pushes against said fan switch, said fan is shut off and stopped due to the function of said switchboard; when the bottom rim of said pull cylinder is detached from said fan switch, said fan switch is raised and said fan is connected and start turning due to the function of said switchboard. Said pull cylinder and said sleeve chuck can slide axially relative to each other, while said fan switch turns on and off the fan through the bottom rim of said pull cylinder, the operation is simple and the structure is compact.

Compared with existing technologies, this invention has the following advantages: this invention provides air inlets and air outlets on the mosquito repellent device and an fan corresponding to air inlets, the airflow from the turning of the fan dispels the medical effect of the mosquito repellent patch inside the mosquito repellent device out of the air outlets, which achieved better mosquito repellent effect. In actual use, the mosquito repellent patch gradually dispels the medical effect under the afterheat of the luminous tube, since the inlets and outlets form a airflow channel, when the fan at air inlets is turned on, the airflow is blown into air inlets and brings the medical odor from the air outlets to the ambience, which broadens the range of medical effect, accelerates the spread of the medical effect of the mosquito repellent patch. Moreover, this invention utilizes the medical effect of the mosquito repellent patch instead of electric mesh for killing mosquitoes, which is safer and can prevent electric shock.

Furthermore, besides mosquito repellent patches, aromatics or deodorizers may also be placed in the mosquito repellent device to achieve the purpose of air purification or perfuming of the mosquito repellent device. This invention can also achieve the opening and closing of air outlets with the structure in which the cover, sleeve chuck and pull cylinder are mutually cooperated, the structure is reasonable and the operation is convenient and quick.

DETAIL DESCRIPTION OF THE INVENTION

Detailed description of this utility model will now be described with reference to the drawings.

Figure 1:
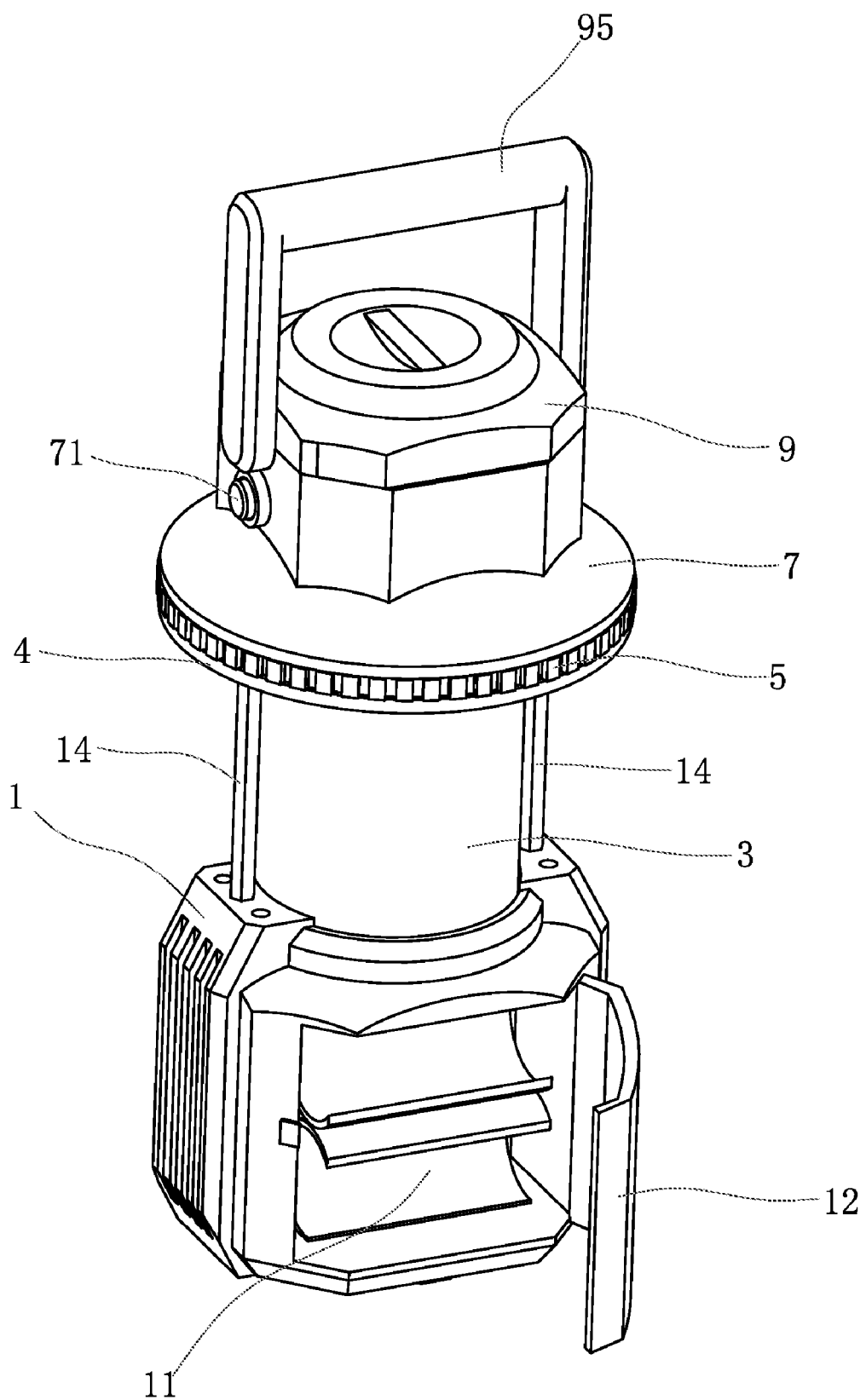
FIG. 1 is the 3D structural diagram of the embodiment of this patent.
Figure 2:
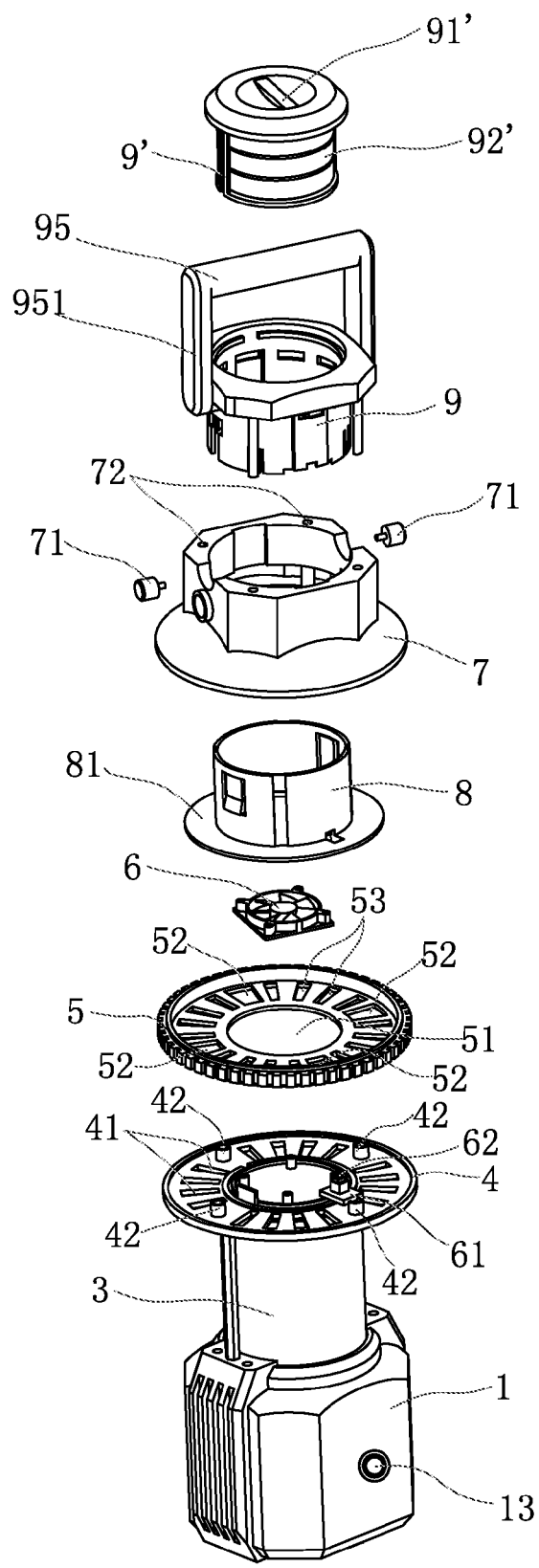
FIG. 2 is the 3 D exploded view of the embodiment of this patent.
Figure 3:
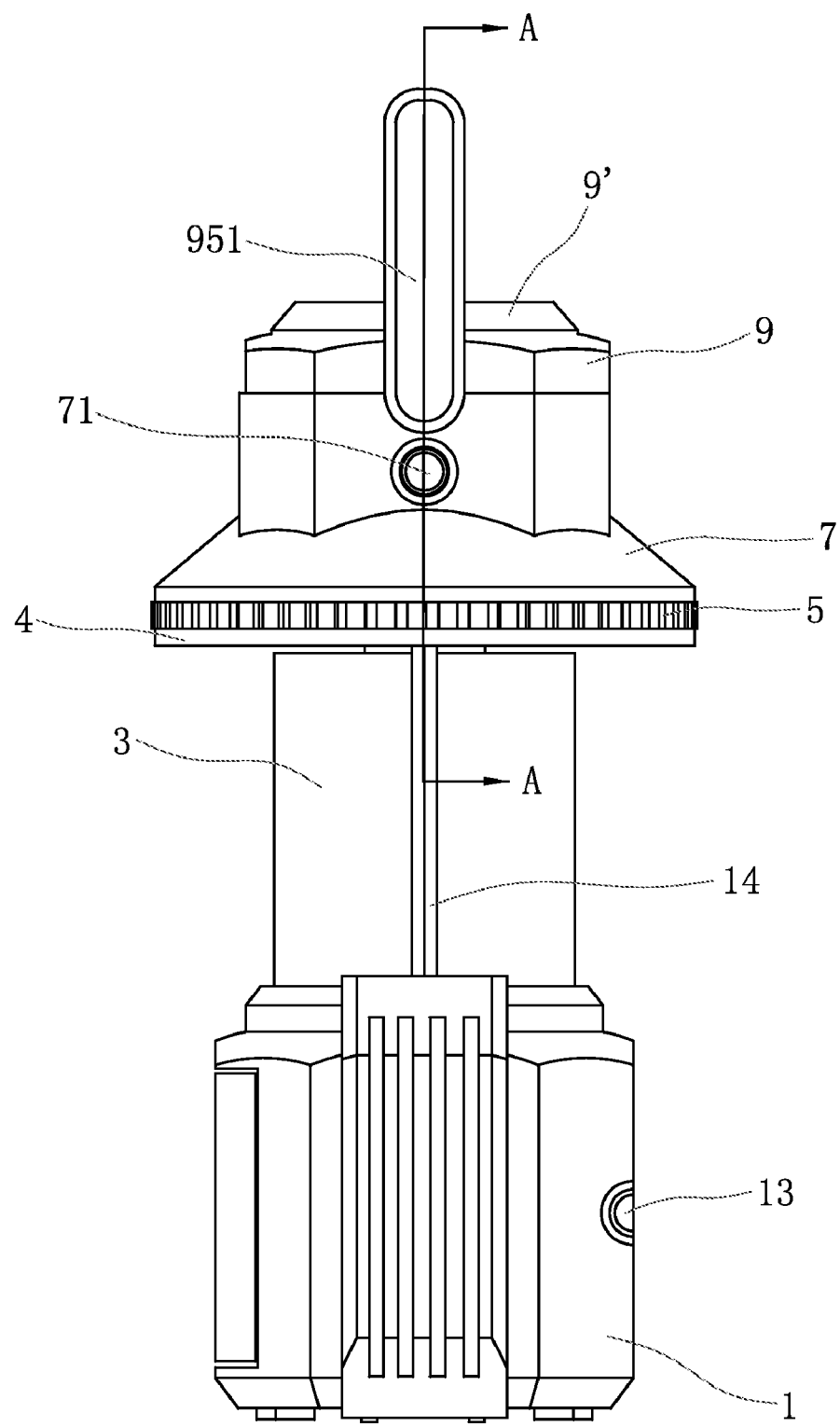
FIG. 3 is a side view of the embodiment of this patent.
Figure 4:
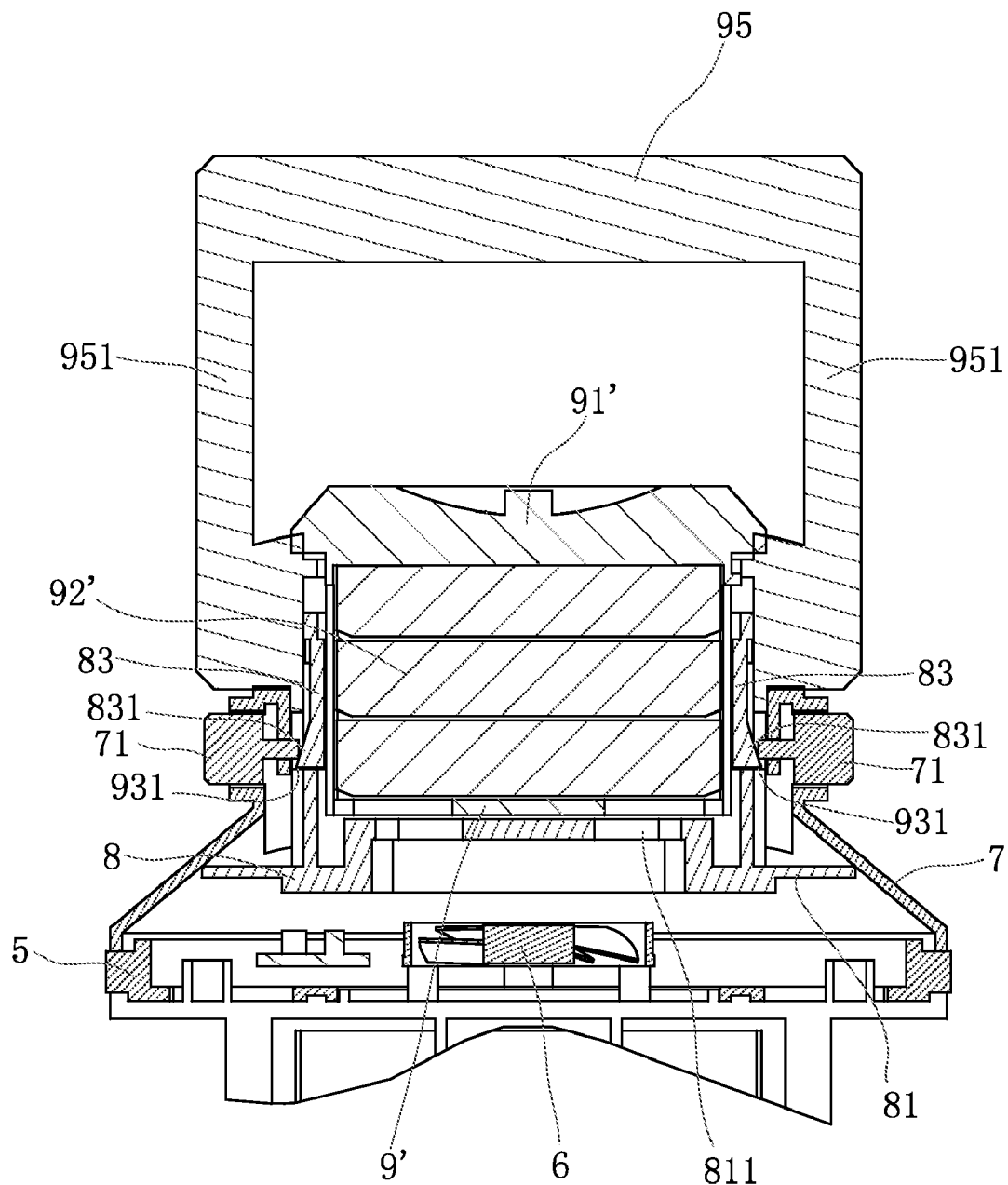
FIG. 4 is a part sectioned view FIG. 3 in A-A direction (tablet box closed)
Figure 5:
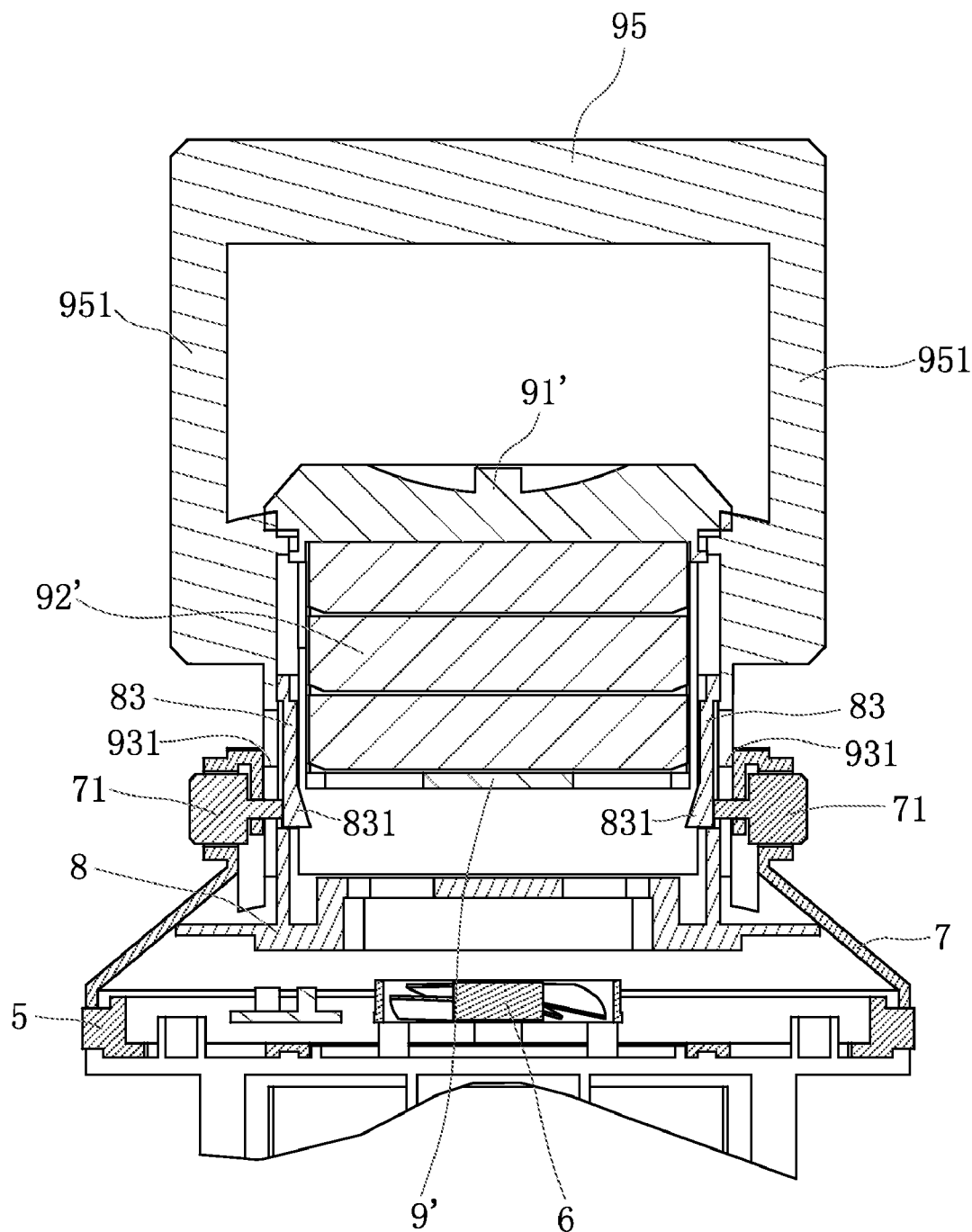
FIG. 5 is a part sectioned view FIG. 3 in A-A direction (tablet box open)
Figure 6:
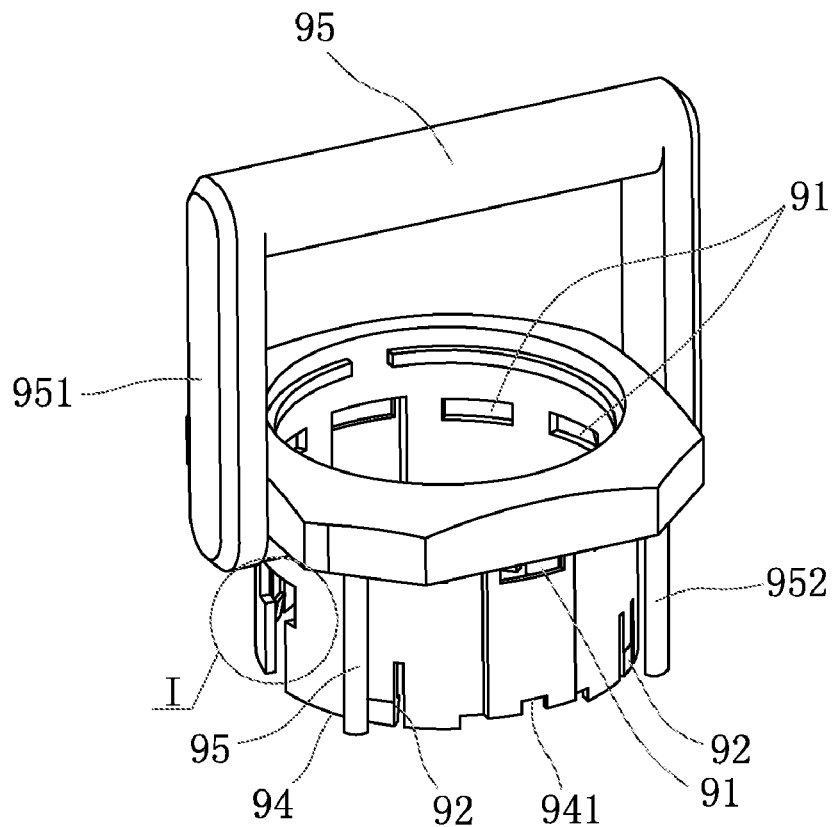
FIG. 6 is a structural diagram of the pull cylinder of the embodiment of this patent.
Figure 7:
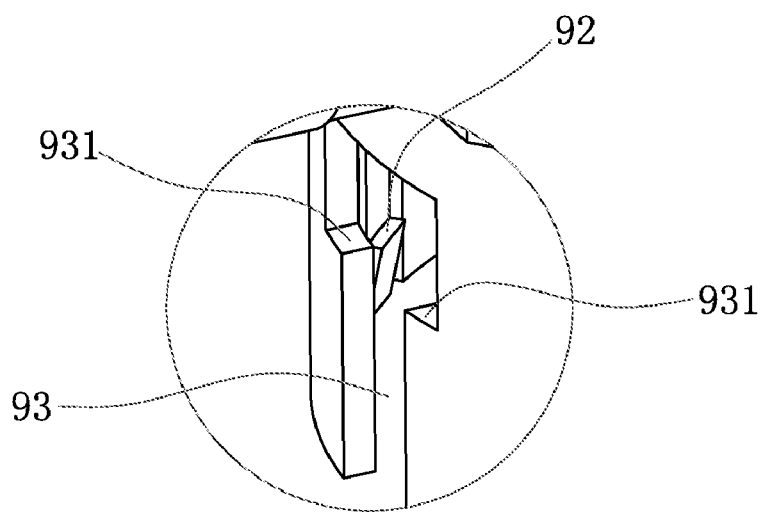
FIG. 7 is a close-up view of part I in FIG. 6.
Figure 8:
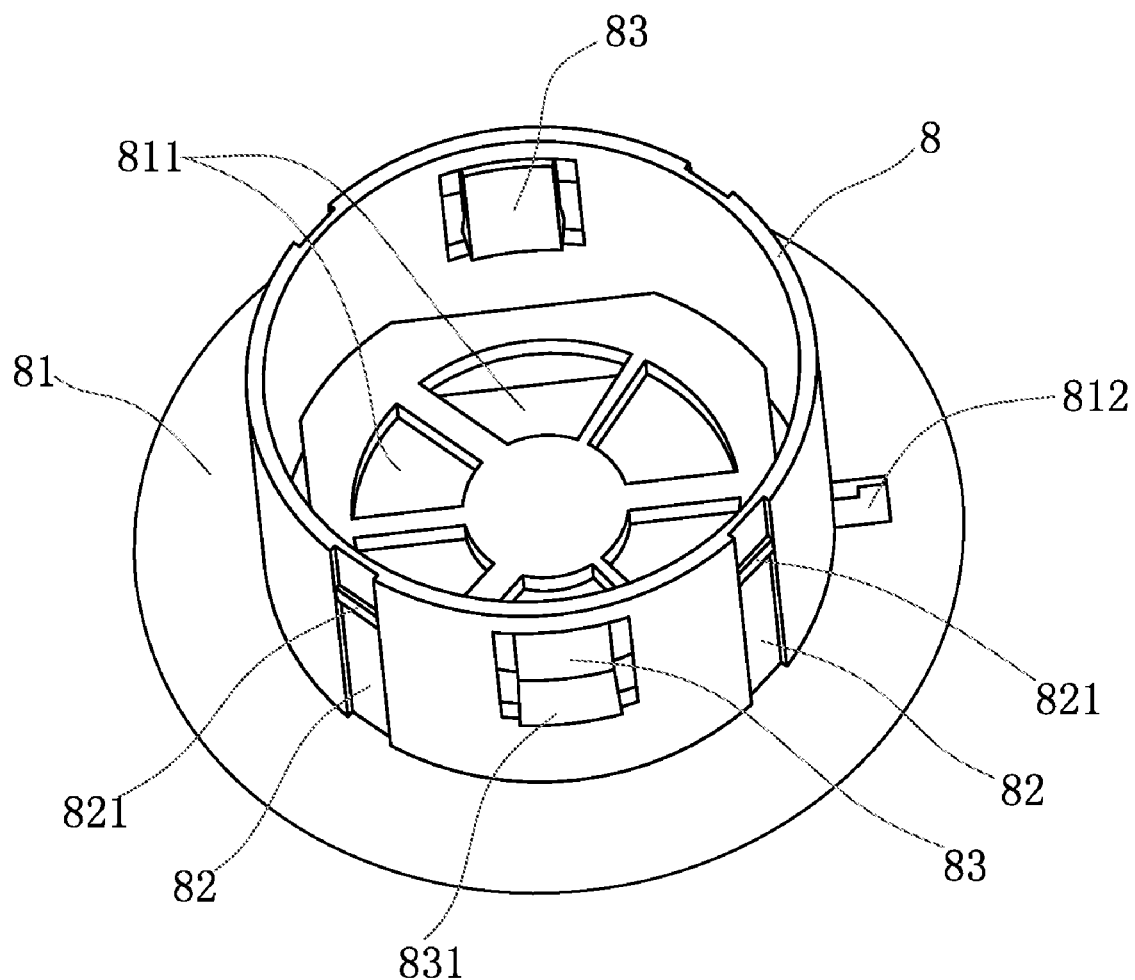
FIG. 8 is a structural diagram of the sleeve chuck of the embodiment of this patent.
Figure 9:
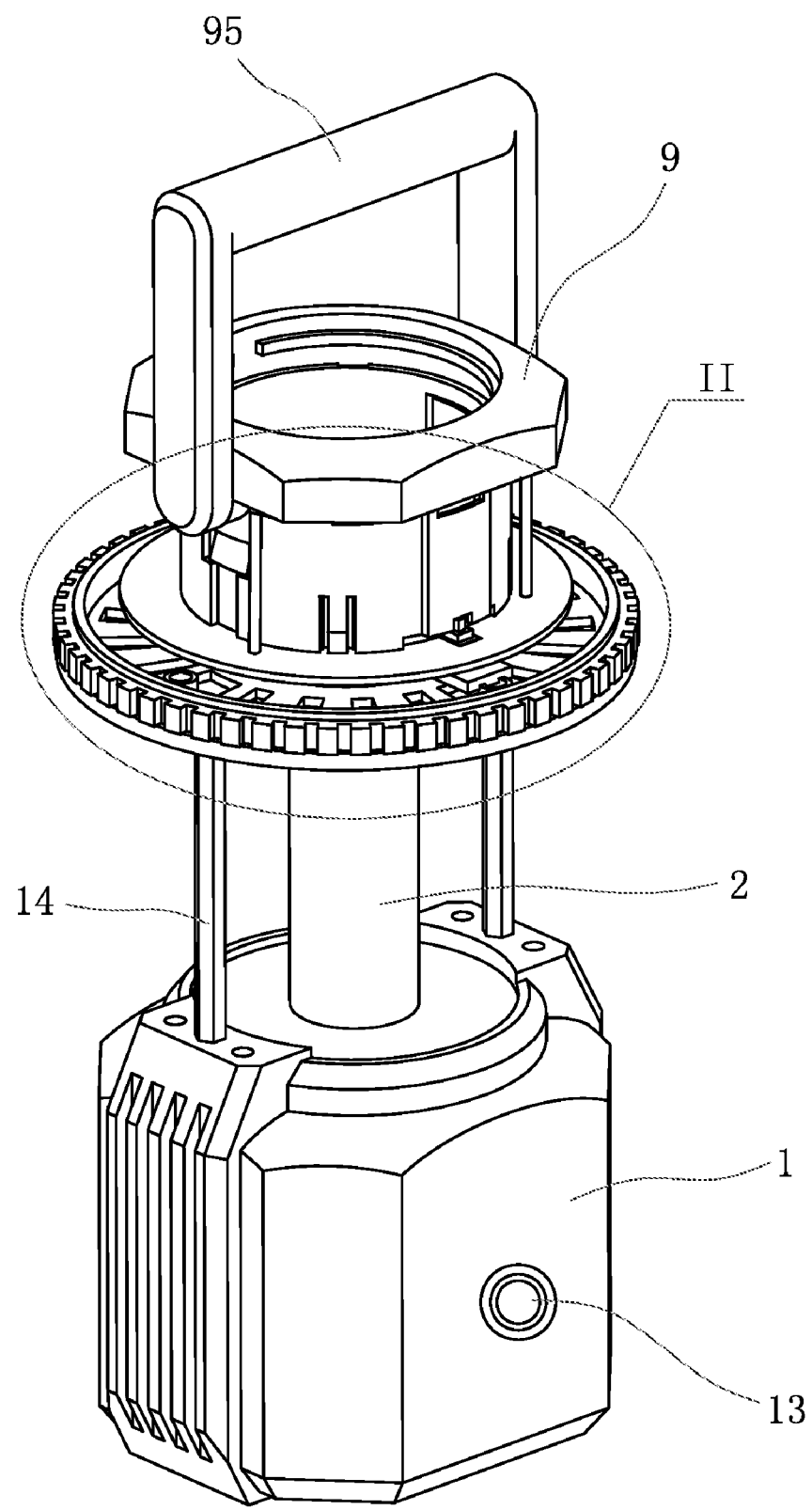
FIG. 9 is another 3D structural diagram of the embodiment of this patent (transparent lamp shade and cover removed)
Figure 10:
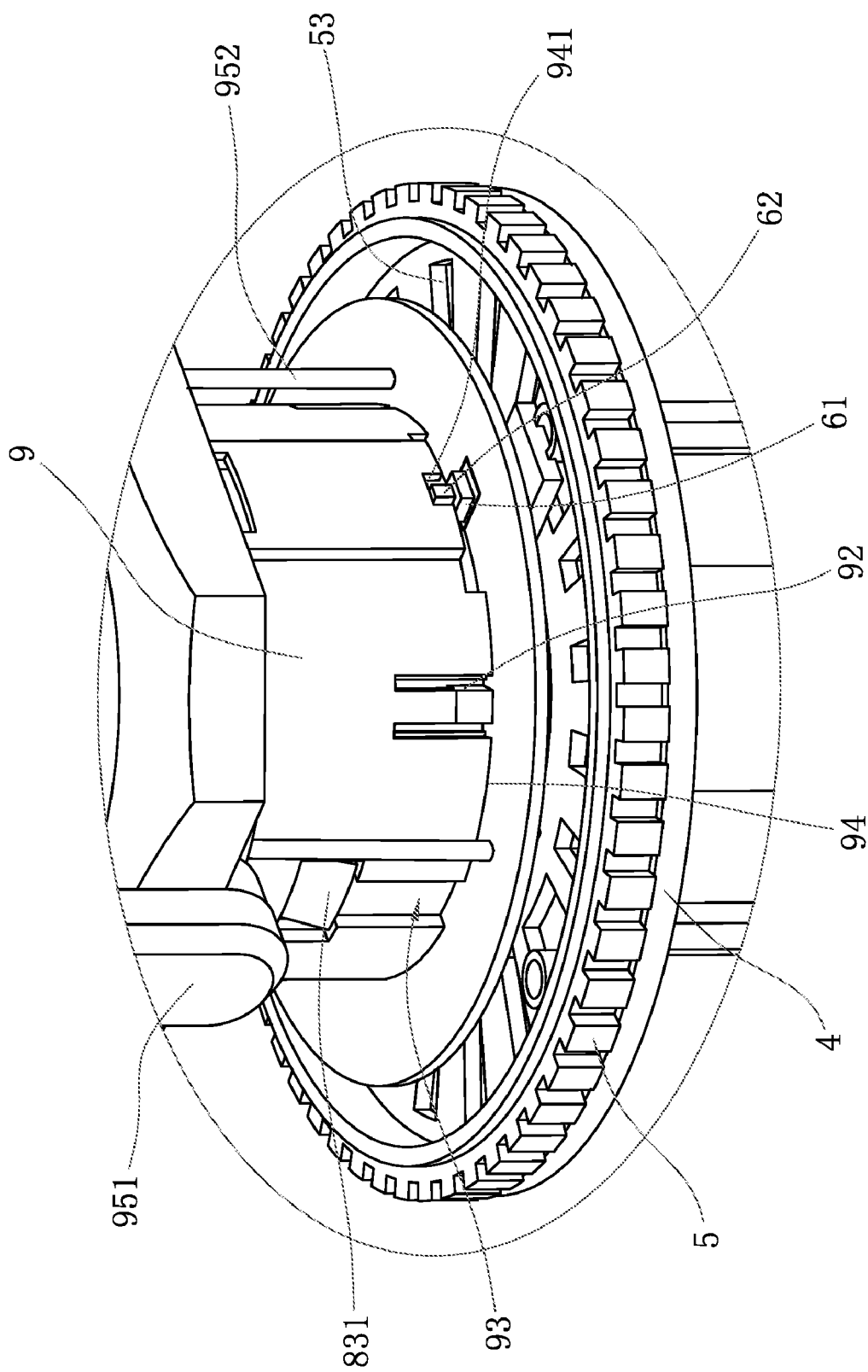
FIG. 10 is a close-up view of part II in FIG. 9.

Please refer to FIG. 1~FIG. 9 for the embodiment:

The mosquito repellent lamp as shown by this embodiment comprises the lamp holder 1, the LED luminous tube 2 and the lamp shade 3, where, the LED luminous tube 2 is mounted in said transparent lamp shade 3, which is fixed on said lamp holder 1, a cavity 11 for containing batteries is provided inside said lamp holder 1, said cavity 11 is further provided with a swinging door 12 that can be opened and closed, a power switch 13 is provided on the external surface of said lamp holder 1 connected electrically with batteries inside said cavity 11 to connect and disconnect the power of the luminous tube 2. In this embodiment, dry batteries or rechargeable batteries are accepted as power supply of the luminous tube, which is safer and can more effectively prevent electric shock.

A round bottom plate 4 is fixed on the top of the lamp shade 3, multiple ventilating holes 41 are provided at even interval along the circumference of said bottom plate 4, said bottom plate 4 is rotatably connected with a round rotary plate 5 with the same size of said bottom plate 4 through the cooperation of the protruding ring and the annular groove, said rotary plate 5 is provided with a center hole 51 at the center and 4 locating holes 52 along the circumference rotary plate 5, it is further provided with grid holes 53 along the circumference that can be aligned with said ventilating holes 41, 4 columns 42 that can be inserted respectively in corresponding locating holes 52 on said rotary plate 5 are provided on the surface of said bottom plate 4 for limiting the rotation angles of the rotary plate 5 relative to said bottom plate 4.

A fan 6 is fixed at the center of said bottom plate 4, the center hole 51 of said rotary plate 5 allows said fan 6 to pass through, a switchboard 61 with a fan switch 62 is provided on said bottom plate 4, said switchboard 61 is electrically connected with said fan 6 and can control the turning and stopping of said fan 6 through the fan switch 62 on the switchboard 61.

A mosquito repellent device comprising the cover 7, sleeve chuck 8 and pull cylinder 9 is provided on top of the fan, where, said cover 7 is hollow and is fixedly connected with said bottom plate 4 through bolts;

Said sleeve chuck 8 is provided inside said cover 7, with one end connected with a base plate 81, on which air inlets 811 are provided, a slot hole 812 for said fan switch 62 to pass is provided between said base plate 81 and said sleeve chuck, said base plate 81 and the inner wall of said sleeve chuck 8 form a cavity capable of containing said mosquito repellent patch, during the installation, air inlets 811 on said base plate 81 are opposite to said fan 6, said fan switch 62 sticks out through the slot hole 812 of said base plate 81, and said base plate 81 and said bottom plate 4 are fixedly connected via bolts;

Said pull cylinder 9 sleeves around said sleeve chuck 8 and capable of axially sliding in relation to said sleeve chuck 8 till fully pulled open, while said cover 7 sleeves said pull cylinder 9, namely, said pull cylinder 9 is provided between the outer wall of said sleeve chuck 8 and the inner wall of said cover 7. air outlets 91 are opened along the circumference of said pull cylinder 9, when said pull cylinder 9 sticks out of said cover 7 through said sleeve chuck 8, said air outlets 91 are open; when said pull cylinder 9 retracts back inside said cover 7, said air outlets 91 are closed.

To prevent said pull cylinder 9 from dropping during axial sliding relative to said sleeve chuck 8 and maintain the sleeve joint of said pull cylinder 9 and said sleeve chuck 8, guide grooves 82 are provided axially along the outer wall of said sleeve chuck 8, protrusions 821 protruding radially outwards with the same width of the guide grooves 82 are provided on the inner wall of the guide grooves 82, correspondingly, hooks 92 capable of axial sliding along said guide grooves 82 and push against protrusions 821 in guide grooves 82 are provided on the inner wall of said pull cylinder 9, when said pull cylinder 9 slides axially relative to said sleeve chuck 8 and said hooks 92 push against said protrusions 821, said pull cylinder 9 slides axially relative to said sleeve chuck 8 to the limited position and cannot be further pulled.

When said pull cylinder 9 slides axially relative to said sleeve chuck 8 and sticks out of said cover 7 or retracts back into said cover 7, to prevent the relative sliding between said pull cylinder 9 and said sleeve chuck 8 and to realize the axial locking effect between said pull cylinder 9 and said sleeve chuck 8, a pair of clips 83, opposite to each other, with elastic protrusions 831 are further provided along the diameter on the circumference of said sleeve chuck 8, the upper end of each of said clips 83 is connected on the circumference of said sleeve chuck 8, the elastic protrusion 831 on the lower part of each clips 83 is a free end with elasticity;

Correspondingly, 2 T-slots 93 are provided on the circumference of said pull cylinder 9 respectively corresponding to clips 83 on said sleeve chuck 8, where, the lower end of each T-slot 93 is a smaller opening part and the upper end is a bigger closed part, moreover, the bigger part and the smaller part of said T-slot 93 form the inner shoulders 931, protrusions 831 of clips 83 of sleeve chuck 8 match to the larger parts of T-slots 93, and protrusions 831 can be engaged with the inner shoulders 931 of T-slots 93;

snap buttons 71 are provided on the position on the circumference of cover 7 corresponding to the elastic protrusion 831 of each clips 83, a small spring supports between the snap buttons 71 and the side mounting base of the cover 7, the inner end of each of said snap buttons 71 is received in said T-slot 93 and can move axially relative to the T-slot 93, when the pull cylinder 9 completely retracts back into the cover 7, the elastic protrusions 831 are engaged with the inner shoulders 931 of the T-slots 93, pull cylinder 9 is locked axially relative to said sleeve chuck 8, the bottom rim 94 of the pull cylinder 9 is provided with a groove 941, which pushes against the fan switch 62 sticking out of the slot hole 812, the power of the fan 6 is cut and the fan does not turn. At this time, press the snap buttons 71 on the cover, the elastic protrusions 831 are offset due to the extrusion of the inner end of the snap buttons 71, releasing the position limit for the pull cylinder 9, which can then slide axially along the sleeve chuck 8 and stick out of the cover 7, with the pull cylinder 9 pulling out the cover 7 upwards, the bottom rim 94 of the pull cylinder 9 departs from the fan switch 62, turning on the power of the fan 6 and make it turn;

During the period when the pull cylinder 9 is pulled axially relative to the sleeve chuck 8, when the hooks 92 on the inner wall of the pull cylinder 9 push against the protrusion 821 on the outer wall of the sleeve chuck 8, which makes the pull cylinder 9 fully pulled open relative to the sleeve chuck 8, at this time, release the snap buttons 71, the elastic protrusions 831 will be released from the extrusion of the snap buttons 71 and return to the original position, and finally break away from the opening of the T-slot 93 and push against the bottom rim 94 of the pull cylinder 9, thus realizing axially position limit of the pull cylinder 9 relative to the sleeve chuck 8, which can prevent the pull cylinder 9 from being detached from the sleeve chuck 8. Of course, the elastic protrusions 831 will be released from the extrusion of the snap buttons 71 and return to the original position, and finally break away from the opening of the T-slot 93 and push against the bottom rim 94 of the pull cylinder 9, the upper position of the pull cylinder 9 is limited by the protrusions 821 of the sleeve chuck 8 and the lower position of it is limited by the elastic protrusions 831, thus realizing the downward axial positioning of the pull cylinder 9 relative to the sleeve chuck 8;

At this time, press the snap buttons 71 again, which will extrude the elastic protrusions 831 inward and make the sleeve chuck 8 release the downward axial position limit for the pull cylinder 9, then the snap buttons 71 are clipped in the opening of the smaller part of the T-slot 93 again, and with the downward movement of the pull cylinder 9, it pass from the smaller part of the T-slot 93 into the larger part, when the pull cylinder 9 completely retracts back into the cover, release the snap buttons 71, the elastic protrusions 831 are received in the larger part of the T-slot 93 again and push against the inner shoulders 931, the pull cylinder 9 is axially locked relative to the sleeve chuck 8, then the bottom rim 94 of the pull cylinder 9 push against the fan switch 62 sticking out of the slot hole 812 of the sleeve chuck 8, the power of the fan 6 is cut and the fan stop turning.

To facilitate the user to carry this mosquito repellent lamp, said pull cylinder 9 is further connected with a handle 95, the 2 rockers 951 of said handle are respectively connected with the pull cylinder 9 by hinge. The user can hold the handle to lift the whole mosquito repellent lamp, when the lamp is to be laid aside, the handle can be lowered to facilitate storage.

In this embodiment, the mosquito repellent patch is mounted in the patch box 92' with ventilating hole, and then said patch box 92' is inserted in a frame 9' with a "☐-shaped" section, said frame 9' adopts a turning cover 91', when said frame 9' is put inside a cavity formed by inner wall of said sleeve chuck 8 and the base plate 81 of said sleeve chuck 8, said turning cover 91' can be rotatably engaged with the inner wall close to the upper part of said pull cylinder 9 after rotatably offset. When the turning cover 91' and the inner wall of the pull cylinder 9 are engaged, the frame 9' is fixed in the sleeve chuck 8, when the pull cylinder 9 is pulled out from the sleeve chuck 8, the medical effect of the mosquito repellent patch can be dispelled through air outlets 91 on the circumferential wall of the pull cylinder 9; when the pull cylinder 9 retracts back into the cover 7, the frame 9' with the mosquito repellent patch is contained in the sleeve chuck 8, preventing the patch from volatilization or damp when laid aside. To replace the patch, just turn the turning cover 91' reversely to release the engagement between the turning cover 91' and the inner wall of the pull cylinder 9, then the frame 9' can be taken out from the sleeve chuck 8, which is very convenient.

Aromatics or deodorizers may also be used in the patch box as substitute of the mosquito repellent patch to realize air purification or perfuming.

Besides, the bottom plate 4 and the lamp holder 1 is connected with a supporting rod 14, which can make the bottom plate 4 more stably fixed on the lamp shade 3, prevent the bottom plate 4 from being flexible and achieve certain supporting effect, to prevent the pull cylinder 9 from being detached from the sleeve chuck 8 axially, a connecting rod 952 is also fixed on the pull cylinder 9, an axle hole 72 allowing the connecting rod 952 to be fully inserted are provided at locations on the cover 7 corresponding to the connecting rod 952, when the pull cylinder 9 slide axially along the sleeve chuck 8, the connecting rod 952 may be inserted into or pulled out of the axle hole 72.

Basic working principle of this embodiment:

In the initial status, the pull cylinder 9 is inside the cover 7, at this time the fan switch 62 cuts off the power and prevent the fan from turning under the pushing of the groove 94 on the bottom rim of the pull cylinder 9, the mosquito repellent patch is enclosed in the cavity formed by the inner wall of the sleeve chuck 8 and the cover 7.

When snap buttons 71 on both sides of the cover are pressed, snap buttons 71 will extrude the elastic protrusions 831 of the sleeve chuck, thus making the sleeve chuck 8 unlock the pull cylinder 9, the pull cylinder 9 can slide axially upwards along the sleeve chuck 8 and stick out of the cover 7 and be positioned axially, thus the air outlets 91 on the circumferential wall of the pull cylinder 9 are opened, the groove 94 on the bottom rim of the pull cylinder is detached from the fan switch 62, the fan is powered on and starts turning, the airflow generated by the turning of the fan is blown in through the air inlets 811 on the base plate 81 of the sleeve chuck and is then blown out through the air outlets 91 of the pull cylinder 9, then the medical odor of the mosquito repellent patch is dispelled as driven by the airflow.

Then, the user may rotate the rotary plate 5 to align the grid holes 53 on the rotary plate with the ventilating holes 41 on the bottom plate 4 to open the ventilating holes, the medical odor of the mosquito repellent patch can also be dispelled from the ventilating holes to get better effect.

When the mosquito repellent patch is not used, just make the pull cylinder 9 retract back to the cover 7 and be locked, turn the rotary plate 5 to close the ventilating holes, thus the mosquito repellent patch is tightly contained in the cavity formed by the inner wall of the sleeve chuck and the base plate, at this time, the mosquito repellent lamp can be used just as ordinary light.

What is claimed is:

1. A mosquito repellent lamp comprising:
   a lamp holder (1) provided with a lamp shade (3) with a luminous tube (2);
   a power switch (13) mounted on said lamp holder (1) and electrically connected with said luminous tube (2) to control the turning on and off of said luminous tube (2);
   a mosquito repellent device with an embedded mosquito repellent patch mounted on the top of said lamp shade (3);
   said mosquito repellent device is provided with a cavity for containing said mosquito repellent patch, said cavity is provided with air inlets (811) and air outlets (91) which are interconnected;
   a fan (6) provided corresponding to said air inlets (811);
   a switch board (61) for controlling working status of said fan (6) and said luminous tube (2), said switch board (61) has a fan switch (62) for turning and stopping said fan (6).

2. The mosquito repellent lamp according to claim 1, wherein said mosquito repellent device comprises:
   a hollow cover (7);
   a sleeve chuck (8) in said cover (7) has a base plate (81) with said air inlets (811), said base plate (81) and the inner wall of said sleeve chuck (8) form a cavity for containing said mosquito repellent patch, said fan (6) is set under said air inlets (811);
   a pull cylinder (9), which is sleeved around said sleeve chuck (8) and capable of axially sliding in relation to said sleeve chuck (8) till fully pulled open, said cover (7) is sleeved around said pull cylinder (9), said air outlets (91) is opened on the pull cylinder, when that said pull cylinder (9) sticks out of said cover (7), said air outlets (91) is open, when said pull cylinder (9) retracts back inside the cover (7), said air outlets (91) is closed;
   a locking structure is provided between said pull cylinder (9), sleeve chuck (8) and cover (7) to realize the axial positioning of said pull cylinder (9) on said sleeve chuck (8) when said pull cylinder (9) sticks out of or retracts back inside said cover (7).

3. The mosquito repellent lamp according to claim 2, wherein said locking structure is:
   Clips (83) with elastic protrusions (831) provided on the circumference of said sleeve chuck (8);
   correspondingly, a T-slot (93) is made relative to said clips (83) on the circumference of said pull cylinder (9), where, said T-slot (93) is open on the bottom and provided with inner shoulders (931) on the top, said protrusions (831) may be engaged with the inner shoulders (931) of said T-slots (93) to limit the position of said pull cylinder (9) axially;
   Snap buttons (71) are provided at positions on the circumference of said cover (7) opposite to the said elastic protrusions (831) of said clips (83), said snap buttons (71) are received in said T-slot (93) and can move axially relative to said T-slot (93), when said pull cylinder (9) retracts completely back inside said cover (7) and said snap buttons (71) are pressed, said elastic protrusions (831) will release the limit for the position of said pull cylinder (9) as being offset by the extrusion of said snap buttons (71), said pull cylinder (9) can slide axially out of said cover (7) along said sleeve chuck (8);
   When said pull cylinder (9) is fully pulled open axially relative to said sleeve chuck (8), the hooks (92) on the inner circumference of said pull cylinder (9) is connected with the protrusions (821) on the guide grooves (82) of said sleeve chuck (8) to limit the position of said pull cylinder (9) axially.

4. The mosquito repellent lamp according to claim 3, wherein when the pull cylinder (9) is pulled open axially relative to said sleeve chuck (8), said elastic protrusions (831) are released from the extrusion of said snap buttons (71) and returns to the original location and finally breaks away from the opening of the T-slot (93) and push against the bottom rim (94) of the pull cylinder (9), thus realizing axially positioning of the pull cylinder (9) relative to the sleeve chuck (8).

5. The mosquito repellent lamp according to claim 2, wherein said pull cylinder (9) is further provided with a handle (95).

6. The mosquito repellent lamp according to any of claim 2, wherein aid cover (7) is fixedly connected to a ventilating device, which is provided with at least one ventilating hole (41) that can be open and closed, and said ventilating hole (41) is opposite to and can be connected to the air inlets (811) on the base plate (81) of said sleeve chuck (8).

7. The mosquito repellent lamp according to claim 6, wherein said ventilating device comprises a bottom plate (4) with said ventilating hole (41) and a rotary plate (5) rotatably connected on said bottom plate (4), said rotary plate (5) is provided with grid holes (53) capable of being aligned to said ventilating holes (41), when said rotary plate (5) is turned so as to allows said grid holes (53) to be aligned with corresponding ventilating hole (41), said ventilating holes (41) are open; when said rotary plate (5) is turned so as to make said grid holes (53) to be staggered with corresponding ventilating holes (41), said ventilating holes (41) are closed.

8. The mosquito repellent lamp according to claim 7, wherein said bottom plate (4) is fixedly connected to said fan (6), moreover, said switchboard (61) is fixed on said bottom plate (4), said switchboard (61) is provided with said fan switch (62) to turn and stop said fan (6), a slot hole (812) is provided on the base plate (81) of said sleeve chuck (8) for allowing said fan switch (62) to be led out, when the bottom rim of said pull cylinder (9) pushes against said fan switch (62), said fan switch (62) is pushed and said fan (6) is shut off and stopped due to the function of said switchboard (61); when the bottom rim of said pull cylinder (9) is detached from said fan switch (62), said fan switch (62) is raised and said fan (6) is connected and start turning due to the function of said switchboard (61).

9. The mosquito repellent lamp according to claim 8, wherein said mosquito repellent patch is installed in the patch box (92') with a ventilating hole, said patch box (92') is inserted in a frame (9'), said frame (9') is provided with a turning cover (91') on the top, when said frame (9') is put inside a cavity formed by inner wall of said sleeve chuck (8) and the base plate (81) of said sleeve chuck, said turning cover (91') can be rotatably engaged with the inner wall close to the upper part of said pull cylinder (9).

* * * * *